(12) United States Patent
Louzoun et al.

(10) Patent No.: US 7,139,856 B2
(45) Date of Patent: Nov. 21, 2006

(54) USE OF SET-BY-READ AND SET-BY-WRITE REGISTERS AS SEMAPHORES

(75) Inventors: Eliel Louzoun, Jerusalem (IL); Nimrod Diamant, Kfar-Saba (IL)

(73) Assignee: Intel Corporation, Santa Clara, CA (US)

( * ) Notice: Subject to any disclaimer, the term of this patent is extended or adjusted under 35 U.S.C. 154(b) by 579 days.

(21) Appl. No.: 10/037,670

(22) Filed: Jan. 3, 2002

(65) Prior Publication Data

US 2003/0135677 A1    Jul. 17, 2003

(51) Int. Cl.
*G06F 13/00* (2006.01)
(52) U.S. Cl. ...................................... 710/240; 710/200
(58) Field of Classification Search ................ 710/200; 718/1, 100–108; 707/8; 711/154, 155, 152, 711/145, 163
See application file for complete search history.

(56) References Cited

U.S. PATENT DOCUMENTS

| | | | |
|---|---|---|---|
| 5,276,886 A | * | 1/1994 | Dror ........................... 710/240 |
| 5,526,487 A | * | 6/1996 | Schiffleger ..................... 710/1 |
| 5,669,002 A | * | 9/1997 | Buch ........................... 710/200 |
| 5,968,143 A | * | 10/1999 | Chisholm et al. ............. 710/23 |
| 5,987,550 A | * | 11/1999 | Shagam ....................... 710/119 |
| 6,446,149 B1 | * | 9/2002 | Moriarty et al. ............. 710/110 |
| 6,529,933 B1 | * | 3/2003 | Montgomery et al. ...... 718/102 |
| 6,529,983 B1 | * | 3/2003 | Marshall et al. ............ 710/200 |
| 6,745,274 B1 | * | 6/2004 | Snyder et al. ............... 710/240 |

FOREIGN PATENT DOCUMENTS

JP    410177560 A  *  6/1998

* cited by examiner

*Primary Examiner*—Glenn A. Auve
(74) *Attorney, Agent, or Firm*—Blakely, Sokoloff, Taylor & Zafman LLP

(57) ABSTRACT

A request is received from a first requester to write a second indicator that includes an identifier of the first requester to a first indicator that indicates if a component is available. In response it is determined whether the component is available. If the component is available, the first indicator is replaced with the second indicator reducing access to the component and permitting access to the component by the first requester.

32 Claims, 5 Drawing Sheets

USE OF SET-BY-READ AND SET-BY-WRITE REGISTERS AS SEMAPHORES

FIELD OF THE INVENTION

The present invention relates to coordinating access to shared resources in a computer system. More particularly, the present invention relates to using registers to coordinate access to the shared resources.

BACKGROUND OF THE INVENTION

A semaphore is a variable in a location in system memory, and indicates the availability of a resource shared by multiple processes in a computer system. Typically, each shared resource has its own semaphore. There are two main types of semaphores: counting semaphores and binary semaphores. A counting semaphore, the value of which can vary between zero and a predetermined positive number that represents the number of processes that can access the shared resource at the same time, is used when more than one process can access the shared resource at the same time. A binary semaphore, however, is used when only one process at a time can access the shared resource. Accordingly, a binary semaphore has only two values, one to show that a process is using the shared resource, and the other to show that no process is using the shared resource.

In order to access a shared resource using a binary semaphore, a process first reads the binary semaphore. If the current value of the binary semaphore indicates that the shared resource is not available, the process can do one of two things. The process can either abandon attempts to access the shared resource, or begin "spinning," i.e., periodically re-reading the binary semaphore until the shared resource becomes available. Conversely, if the process reads the binary semaphore and the current value indicates that the shared resource is available, the process writes to the binary semaphore a value indicating to other processes that the shared resource is not available, and accesses the shared resource. When finished using the shared resource, the process releases it by writing to the binary semaphore a value indicating that the shared resource is available. If another process has been spinning, the read executed after the shared resource becomes available will reveal to the spinning process that the shared resource is available. The spinning process can then write to the binary semaphore a value indicating to other processes that the shared resource is not available and access the shared resource, as explained previously.

The sequence of reading a binary semaphore, determining that a shared resource is available, writing to the binary semaphore a value indicating to other processes that the shared resource is not available, and accessing the shared resource, is known as "read modify write" (RMW) access. RMW access must be "atomic," i.e., continuous without interference, during the period between reading the binary semaphore when the shared resource is available, and writing to the binary semaphore a value indicating to other processes that the shared resource is not available. If an RMW by a first process is not atomic, then a second process can execute a separate read on the binary semaphore after the first process' read but prior to the first process' write. That is, if the first process does not write to the binary semaphore prior to the second process' read a value indicating that the shared resource is not available, the second process determines that the shared resource is available. Consequently, both the first process and the second process can write to the binary semaphore values indicating to other processes that the shared resource is not available. Each process will therefore believe it has exclusive access to the shared resource, thus resulting in a collision of accesses.

A process can use a "bus lock" to restrict access to a binary semaphore, thereby preventing another process from executing a read during an in-progress RMW, and eliminating the possibility of a collision of accesses to the shared resource. With a bus lock, a process, prior to reading the binary semaphore, locks the bus that provides access to the binary semaphore. The process then attempts RMW access, after which the bus is automatically unlocked. Finally, the process determines whether it was able to write to the binary semaphore a value indicating to other processes that the shared resource is not available. If so, then the shared resource was available at the time of the read, and thus the process can access the shared resource. If not, then the shared resource was not available at the time of the read, and the process cannot access the shared resource.

Though preventing an intervening read during an in-progress RMW, a bus lock can be implemented to restrict access to all semaphores, not just the semaphore subject to the RMW, until the RMW is complete. Furthermore, because semaphores are located in system memory, in some implementations a bus lock might prevent all processes, including those not attempting to read a semaphore, from accessing system memory. In addition, some computer systems do not have bus lock capability. These systems therefore use highly complex algorithms to provide atomic access to semaphores, which reduces system performance.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1:
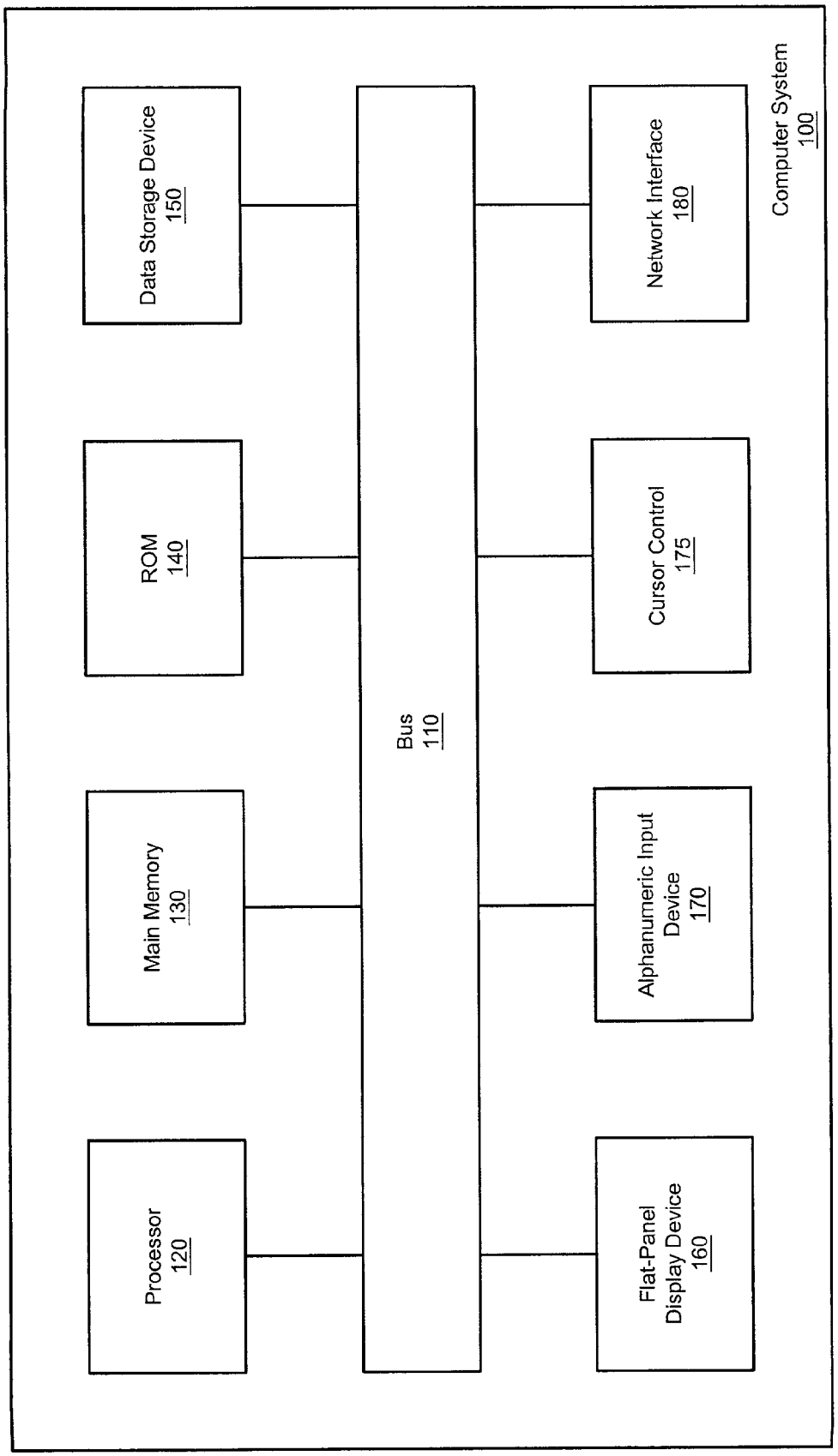
FIG. 1 is a block diagram of one embodiment of a computer system.

The use of a set-by-read register and a set-by-write register as semaphores is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

When a set-by-read register is used as a semaphore, a process reads the set-by-read register to determine whether a shared resource is available. As a result, the set-by-read register determines whether the shared resource is available. If the set-by-read register determines (e.g., by reading its value) that the shared resource is not available at the time of the process' read, then the set-by-read register maintains a value indicating that the shared resource is not available, and returns that value to the process. The process then determines that it has received from the set-by-read register the value indicating that the shared resource is not available, meaning that the process cannot access the shared resource. Consequently, the process either can periodically re-read the set-by-read register until the shared resource becomes available, or abandon attempts to access the shared resource.

Conversely, if the set-by-read register determines that the shared resource is available at the time of the process' read, then the set-by-read register sets itself to a value indicating to other processes and to itself that the shared resource is not available. The set-by-read register then returns to the process a value indicating that the shared resource is available, and the process determines that it has received that value from the set-by-read register. Therefore, the process accesses the shared resource, and when finished using the shared resource, writes to the set-by-read register a value indicating that the shared resource is available.

With a set-by-write register used as a semaphore, a process writes its identifier to the set-by-write register. As a result, the set-by-write register determines whether the shared resource is available. If the set-by-write register determines that it contains a value indicating that the shared resource is not available, then the set-by-write register maintains its current value, and does not set itself to the process' identifier as a result of the write. Conversely, if the set-by-write register determines that it contains a value indicating that the shared resource is available at the time of the process' write, then execution of the write causes the set-by-write register to set itself to the process' identifier.

Once the set-by-write register has either maintained its current value or set itself to the process' identifier, the process executes a read on the set-by-write register. If the set-by-write register does not contain the process' identifier, the process cannot access the shared resource. The process then either can periodically re-write its identifier to the set-by-write register, followed by execution of a read, until the shared resource becomes available, or abandon attempts to access the shared resource. Conversely, if the process executes the read and the set-by-write register contains the process' identifier, the process accesses the shared resource. As a result, if another process attempts to access the shared resource, the set-by-write register determines that it contains an identifier, which indicates to the set-by-write register that the shared resource is not available. The set-by-write register then can indicate the identifier to the other process, not only to show that the shared resource is unavailable, but also to identify the process that is using the shared resource. When the process has finished using the shared resource, the process writes to the set-by-write register a value indicating that the shared resource is available.

FIG. 1 is a block diagram of one embodiment of a computer system. The computer system is intended to represent a range of computer systems, including, for example, a personal digital assistant (PDA), a laptop or palmtop computer, a cellular phone, etc. Other computer systems can include more, fewer and/or different components.

Computer system 100 includes a bus 110 or other communication device to communicate information, and processor 120 coupled to bus 110 to process information. While computer system 100 is illustrated with a single processor, computer system 100 can include multiple processors and/or co-processors. Bus 110 encompasses all buses that may be present in a computer system, e.g., a Peripheral Component Interconnect (PCI) bus; a Personal Computer Memory Card International Association (PCMCIA) bus; a Universal Serial Bus (USB), etc. See, e.g., PCI Local Bus Specification Revision 2.2, released Dec. 18, 1998; PC Card Standard, March 1997 Release, First Printing; Universal Serial Bus Specification Revision 2.0, issued Apr. 27, 2000.

Computer system 100 further includes random access memory (RAM) or other dynamic storage device 130 (referred to as main memory), coupled to bus 110 to store information and instructions to be executed by processor 120. Main memory 130 also can be used to store temporary variables or other intermediate information while processor 120 is executing instructions. Computer system 100 also includes read-only memory (ROM) and/or other static storage device 140 coupled to bus 110 to store static information and instructions for processor 120. In addition, data storage device 150 is coupled to bus 110 to store information and instructions. Data storage device 150 may comprise a magnetic disk (e.g., a hard disk) or optical disc (e.g., a CD-ROM) and corresponding drive.

Computer system 100 may further comprise a flat-panel display device 160, such as a cathode ray tube (CRT) or liquid crystal display (LCD), to display information to a user. Alphanumeric input device 170, including alphanumeric and other keys, is typically coupled to bus 110 to communicate information and command selections to processor 120. Another type of user input device is cursor control 175, such as a mouse, a trackball, or cursor direction keys to communicate direction information and command selections to processor 120 and to control cursor movement on flat-panel display device 160. Computer system 100 further includes network interface 180 to provide access to a network, such as a local area network.

Instructions are provided to memory from a machine-accessible medium, or an external storage device accessible via a remote connection (e.g., over a network via network interface 180). A machine-accessible medium includes any mechanism that provides (i.e., stores and/or transmits) information in a form readable by a machine (e.g., a computer). For example, a machine-accessible medium includes RAM; ROM; magnetic or optical storage medium; flash memory devices; electrical, optical, acoustical or other form of propagated signals (e.g., carrier waves, infrared signals, digital signals); etc.

In alternative embodiments, hard-wired circuitry can be used in place of or in combination with software instructions to implement the present invention. Thus, the present invention is not limited to any specific combination of hardware circuitry and software instructions.

Figure 2:
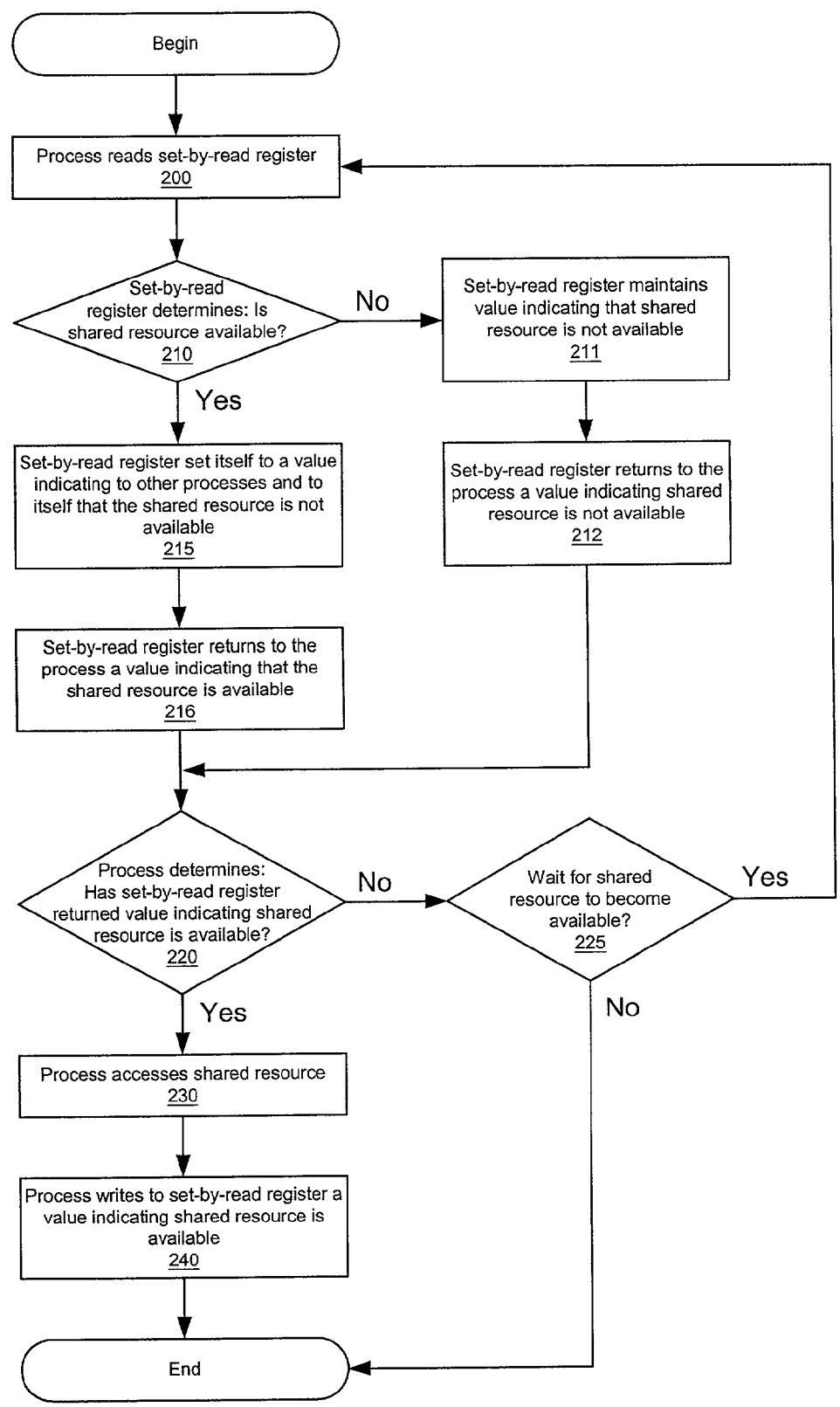
FIG. 2 is a flow chart of a method of one embodiment of a set-by-read register as a semaphore.

FIG. 2 is a flow chart of the operation of a set-by-read register as a semaphore. At 200, a process needing access to a shared resource reads a set-by-read register controlling access to the shared resource. A process is an instance of a program running in a computer. A process is well-known to those of ordinary skill in the art, and thus will not be discussed further except as it pertains to the present invention. In one embodiment, the process is running in the central processing unit (CPU) of the computer system. However, the process can be running in another location of the computer system, e.g., main memory. A shared resource can be a peripheral device (such as a printer or disk drive) or memory, etc. A register is a data storage area. A register is well-known to those of ordinary skill in the art, and thus will not be discussed further except as it pertains to the present invention. A set-by-read register can change the content of its data whenever a read operation is performed on the set-by-read register. In one embodiment, the set-by-read register is located at the shared resource. However, the set-by-read register also can be located at another location in the computer system, e.g., the CPU. At 210, the set-by-read register determines whether the shared resource is available, so that the set-by-read register can determine whether to change its value as a result of the process' read. In one embodiment, the set-by-read register reads its value to determine whether the shared resource is available. However, the set-by-read register, either in lieu of or in addition to reading its value, could read an indicator that is available to the set-by-read register only and not to a process, to determine whether the shared resource is available. For example, the set-by-read register could read a flag (i.e., a software or hardware indicator which is like a switch that can be either on or off to signal a particular condition or status) to determine whether the shared resource is available.

If at 210 the set-by-read register determines the shared resource is not available at the time the process' read, then at 211 the set-by-read register maintains a value indicating that the shared resource is not available, and at 212 returns that value to the process. Conversely, if at 210 the set-by-read register determines that the shared resource is available, then at 215 as a result of the process' read, the set-by-read register sets itself to a value indicating to other processes and to itself that the shared resource is not available. At 216, the set-by-read register returns to the process the value indicating that the shared resource is available. Consequently, if another process executes a subsequent read on the set-by-read register, the set-by-read register determines that the shared resource is not available, and thus does not change its value as a result of the subsequent read.

At 220, the process determines whether as a result of its read it received from the set-by-read register a value indicating that the shared resource is available, meaning that the process has access to the shared resource. If the process received from the set-by-read register a value indicating that the shared resource is not available, then the process cannot access the shared resource, and at 225 determines whether to wait for the shared resource to become available. In one embodiment, the process can re-read the set-by-read register periodically until the shared resource becomes available, or abandon its current attempt to access the shared resource.

Conversely, if at 220 the process determines that it received from the set-by-read register a value indicating that the shared resource is available, then at 230, the process accesses the shared resource. When the process has finished using the shared resource, at 240 the process writes to the set-by-read register a value indicating that the shared resource is available.

In one embodiment, each process attempting to access a shared resource reads one set-by-read register in a specific location (e.g., at the shared resource) known to all processes. In another embodiment, a main set-by-read register that is not accessible to any process is linked to other set-by-read registers at several locations. Each linked set-by-read register is associated with only one process, and is in a specific location known only to its process. When a first process reads its associated set-by-read register, the linked set-by-read register associated with the first process reads the main set-by-read register. The main set-by-read register determines whether the shared resource is available, and thus whether to change its value as a result of the first process' read, as explained previously. While the main set-by-read register is determining whether the shared resource is available, linked set-by-read registers associated with processes other than the first process cannot read the main set-by-read register.

If the main set-by-read register determines that the shared resource is available, it sets itself to a value indicating that the shared resource is not available. Having read the main set-by-read register when it contained the value indicating that the shared resource is available, the linked set-by-read register associated with the first process returns to the first process the value indicating that the shared resource is available. As a result, the first process determines that it received from its associated set-by-read register a value indicating that the shared resource is available, meaning that the first process can access the shared resource. Finally, once the linked set-by-read register associated with the first process has completed its read of the main set-by-read register, the other linked set-by-read registers, if read by their associated processes, can read the main set-by-read register. Any of these other linked set-by-read registers that reads the main set-by-read register will read the value indicating that the shared resource is not available, and return to its associated process the value indicating that the shared resource is not available.

When the first process has finished using the shared resource, it writes to its associated set-by-read register a value indicating that the shared resource is available. The set-by-read register associated with the first process sends to the main set-by-read register the value indicating that the shared resource is available. The main set-by-read register determines that the shared resource has become available, and thus sets itself to the value indicating that the shared resource is available. As a result, the next set-by-read register that reads the main set-by-read register will read the value indicating that the shared resource is available, and return to its associated process the value indicating that the shared resource is available. The coordination of the linked set-by-read registers indicating to their associated processes the value contained in the main set-by-read register may be accomplished by any means in the art, e.g., hardware circuitry, software instructions, etc.

If a set-by-read register contains a value indicating that a shared resource is available, then execution of a single action, i.e., a read, causes the set-by-read register to set itself to a value indicating to other processes and to itself that the shared resource is not available. Consequently, there is no opportunity, between a process' read and the set-by-read register setting itself to a value indicating that the shared resource is not available, for another process to execute a read and determine that the shared resource is available. The sequence of events providing access to the shared resource is therefore atomic. Thus, there is no need for a bus lock to prevent a collision of accesses to the shared resource due to execution of an intervening read between the process' read and the set-by-read register setting itself to a value indicating that the shared resource is not available.

FIG. 2 describes the invention in terms of a method. However, one should also understand it to represent a machine-accessible medium having recorded, encoded or otherwise represented thereon instructions, routines, operations, control codes, or the like, that when executed by or otherwise utilized by the machine, cause the machine to perform the method as described above or other embodiments thereof that are within the scope of this disclosure.

Figure 3:
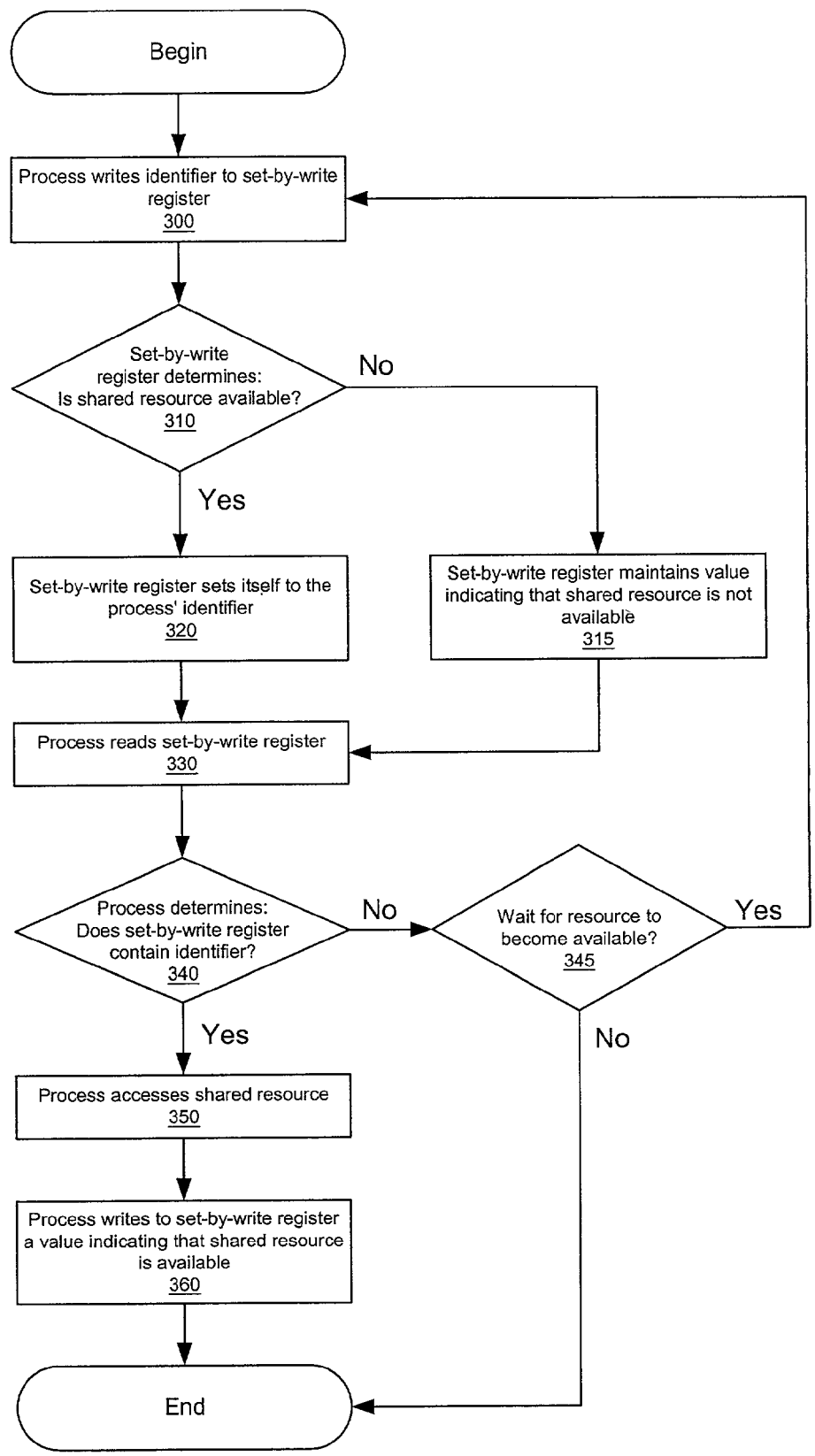
FIG. 3 is a flow chart of a method of one embodiment of a set-by-write register as a semaphore.

FIG. 3 is a flow chart of the operation of a set-by-write register as a semaphore. At 300, a process needing access to a shared resource writes its identifier to a set-by-write register controlling access to the shared resource. A set-by-write register can change the content of its data whenever a write operation is performed on the set-by-write register. In one embodiment, the set-by-write register is located at the shared resource. However, the set-by-write register also can be located at another location in the computer system, e.g., the CPU.

At 310, the set-by-write register determines whether the shared resource is available, so that the set-by-write register can determine whether to set itself to the process' identifier as a result of the process' write. In one embodiment, the set-by-write register reads its value to determine whether the shared resource is available. However, the set-by-write register, either in lieu of or in addition to reading its value, could read an indicator that is available to the set-by-write register only and not to a process, to determine whether the shared resource is available. For example, the set-by-write register could read a flag to determine whether the shared resource is available.

If the set-by-write register determines that the shared resource is not available at the time the process writes its identifier, then at 315 the set-by-write register maintains a value indicating that the shared resource is not available. Conversely, if the process writes its identifier to the set-by-write register and the set-by-write register determines that the shared resource is available, then at 320 the set-by-write register sets itself to the process' identifier. By setting itself to the process' identifier, the set-by-write register indicates to other processes and to itself that the shared resource is not available. Thus, if another process attempts to write a new identifier to the set-by-write register, the set-by-write register determines that it already contains an identifier and does not change its value to the new identifier as a result of the other process' write, because the shared resource is not available. In one embodiment, if a process attempts to access a shared resource via a set-by-write register when the set-by-write register contains another process' identifier, the set-by-write register will indicate the identifier as the value in the set-by-write register. As a result, the set-by-write register can indicate not only that the shared resource is unavailable, but also provide the identity of the process using the shared resource.

Once the set-by-write register has either maintained a value indicating that the shared resource is not available or set itself to the process' identifier, at 330 the process reads the set-by-write register. At 340, the process determines whether the set-by-write register contains the process' identifier. If the set-by-write register has maintained a value indicating that the shared resource is not available, then the process cannot access the shared resource, and at 345 determines whether to wait for the shared resource to become available. In one embodiment, the process can re-write its identifier to the set-by-write register periodically, followed by execution of a read, until the shared resource becomes available, or abandon its current attempt to access the shared resource.

Conversely, if at 340 the process determines that the set-by-write register has set itself to the process' identifier as a result of the process writing its identifier to the set-by-write register, then at 350 the process accesses the shared resource. At 360, having finished using the shared resource, the process writes to the set-by-write register a value indicating that the shared resource is available.

In one embodiment, each process attempting to access the shared resource writes its identifier to one set-by-write register in a specific location (e.g., at the shared resource) known to all processes. In another embodiment, a main set-by-write register in a specific location is linked to other set-by-write registers at several locations. Each linked set-by-write register is associated with only one process, and is in a specific location known only to its process. When a first process writes its identifier to its associated set-by-write register, the linked set-by-write register associated with the first process sends the first process' identifier to the main set-by-write register and reads the main set-by-write register. The main set-by-write register determines whether the shared resource is available, and thus whether to change its value as a result of the process' write, as explained previously. While the main set-by-write register is determining whether the shared resource is available, linked set-by-write registers associated with other processes other than the first process cannot send their process' identifiers to the main set-by-write register.

If the main set-by-write register determines that the shared resource is available, it sets itself to the first process' identifier. Thereafter, when any process (including the first process) reads its linked set-by-write register, the linked set-by-write register associated with the process reads the main set-by-write register. Because the main set-by-write register contains as its value the first process' identifier, the linked set-by-write register returns to its associated process the first process' identifier.

The process then compares its own identifier to the value (i.e., the first process' identifier) returned by the process' associated set-by-write register from the main-set-write register. As a result, only the first process will determine a match between its identifier and the value returned by its associated set-by-write register from the main-set-write register. Thus, the first process has access to the shared resource. Conversely, every other process will determine that its identifier does not match the value returned by the process' associated set-by-write register from the main-set-write register. Accordingly, no other process can access the shared resource.

When the first process has finished using the shared resource, it writes to its associated set-by-write register a value indicating that the shared resource is available. The set-by-write register associated with the first process sends to the main set-by-write register the value indicating that the shared resource is available. The main set-by-write register determines that the shared resource has become available, and thus sets itself to the value indicating that the shared resource is available. As a result, the next set-by-write register that reads the main set-by-write register will read the value indicating that the shared resource is available, and return to its associated process the value indicating that the shared resource is available. The coordination of the linked set-by-read registers indicating to their associated processes the value contained in the main set-by-read register may be accomplished by any means in the art, e.g., hardware circuitry, software instructions, etc.

If a set-by-write register contains a value indicating that a shared resource is available, execution of a single action, i.e., a write, causes the set-by-write register to set itself to a value, e.g., a process' identifier, indicating that the shared resource is not available. Consequently, there is no opportunity between a process writing the identifier to the set-by-write register and the set-by-write register setting itself to the identifier to indicate that the shared resource is not available for another process to execute a write and obtain access to the shared resource. The sequence of events providing access to the shared resource is therefore atomic. Thus, there is no need for a bus lock to prevent a collision of accesses to the shared resource due to execution of an intervening write to the set-by-write register between the process' write and the set-by-write register setting itself to indicate that the shared resource is not available.

FIG. 3 describes the invention in terms of an identifier written to the set-by-write register in an attempt to access the shared resource. However, one should understand that a value other than an identifier could be written to the set-by-write register to attempt to access the shared resource. In addition, FIG. 3 describes the invention in terms of an identifier as the value indicating that the shared resource is not available. However, one should understand that the set-by-write register can, as a result of a process executing a write to the set-by-write register when the shared resource is available, set itself to a value other than an identifier in order to indicate that the shared resource is not available.

FIG. 3 describes the invention in terms of a method. However, one should also understand it to represent a machine-accessible medium having recorded, encoded or otherwise represented thereon instructions, routines, operations, control codes, or the like, that when executed by or otherwise utilized by the machine, cause the machine to perform the method as described above or other embodiments thereof that are within the scope of this disclosure.

Figure 4:
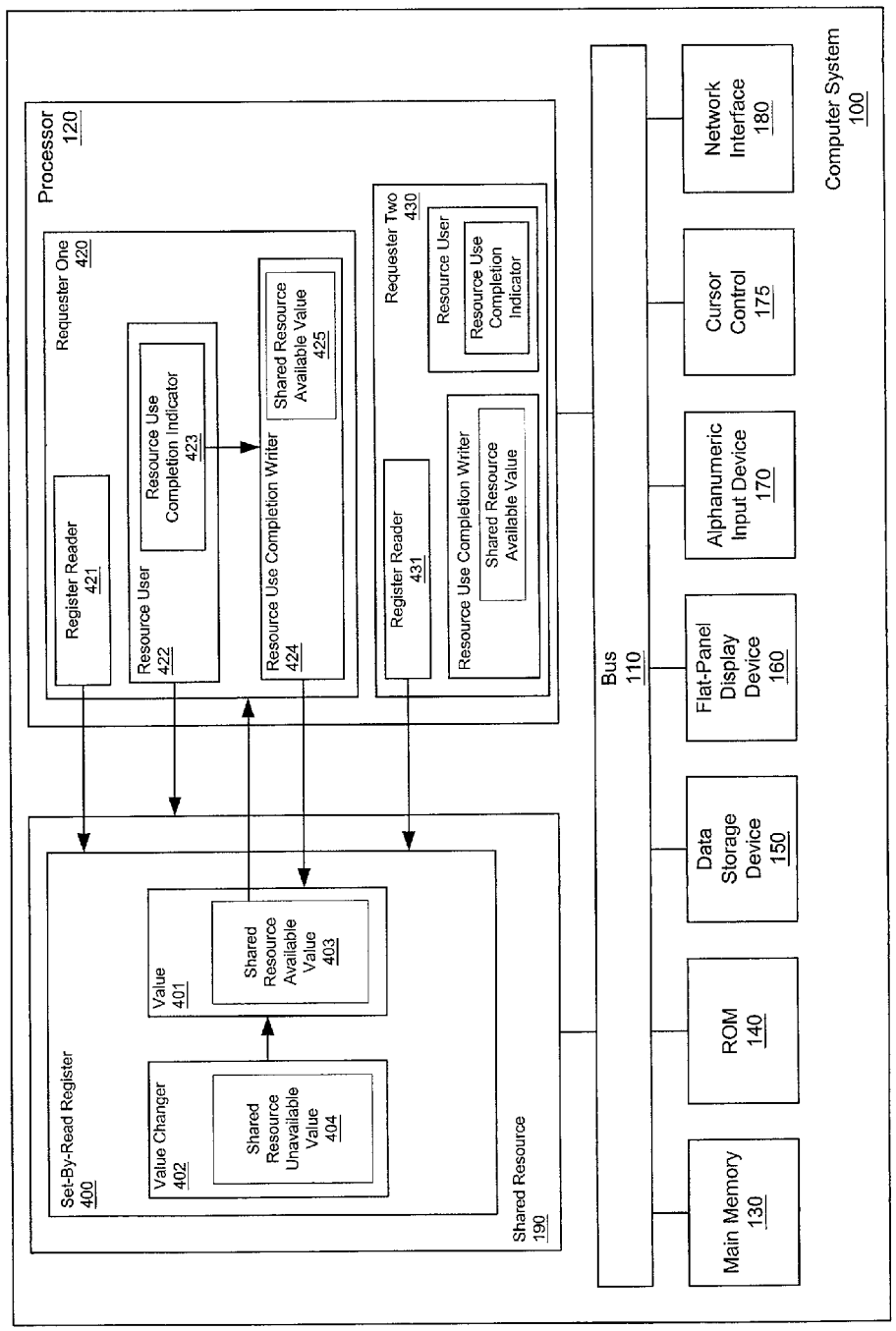
FIG. 4 is a block diagram of a computer system that contains one embodiment of a set-by-read register as a semaphore.

FIG. 4 is computer system 100 modified to include one embodiment of a set-by-read register as a semaphore. Shared resource 190 (e.g., a peripheral device) of computer system 100 contains a set-by-read register 400, which controls access to shared resource 190. Value 401 of set-by-read register 400 is set to shared resource available value 403. Requester one 420 in processor 120 contains a register reader 421 that reads set-by-read register 400. Set-by-read register 400 determines that value 401 contains shared resource available value 403, which indicates that shared resource 190 is available. Thus, the read by register reader 421 causes value changer 402 to set value 401 from shared resource available value 403 to shared resource unavailable value 404 to indicate to other requesters and to set-by-read register 400 that shared resource 190 is not available. Set-by-read register 400 then returns to requester one 420 shared resource available value 403.

Requester one 420 determines that it has received from set-by-read register 400 shared resource available value 403, meaning that it has access to shared resource 190. Thus, resource user 422 accesses shared resource 190. If register reader 431 of requester two 430 reads set-by-read register 400 to determine the availability of shared resource 190 while requester one 420 has access to shared resource 190, set-by-read register 400 determines based on shared resource unavailable value 404 that shared resource 190 is not available. As a result, value changer 402 does not change value 401, which maintains shared resource unavailable value 404. When requester one 420 has finished using shared resource 190, resource use completion indicator 423 of resource user 422 notifies resource use completion writer 424. Resource use completion writer 424 then writes to value 401 shared resource available value 425 indicating that shared resource 190 is available, which replaces shared resource unavailable value 404.

Figure 5:
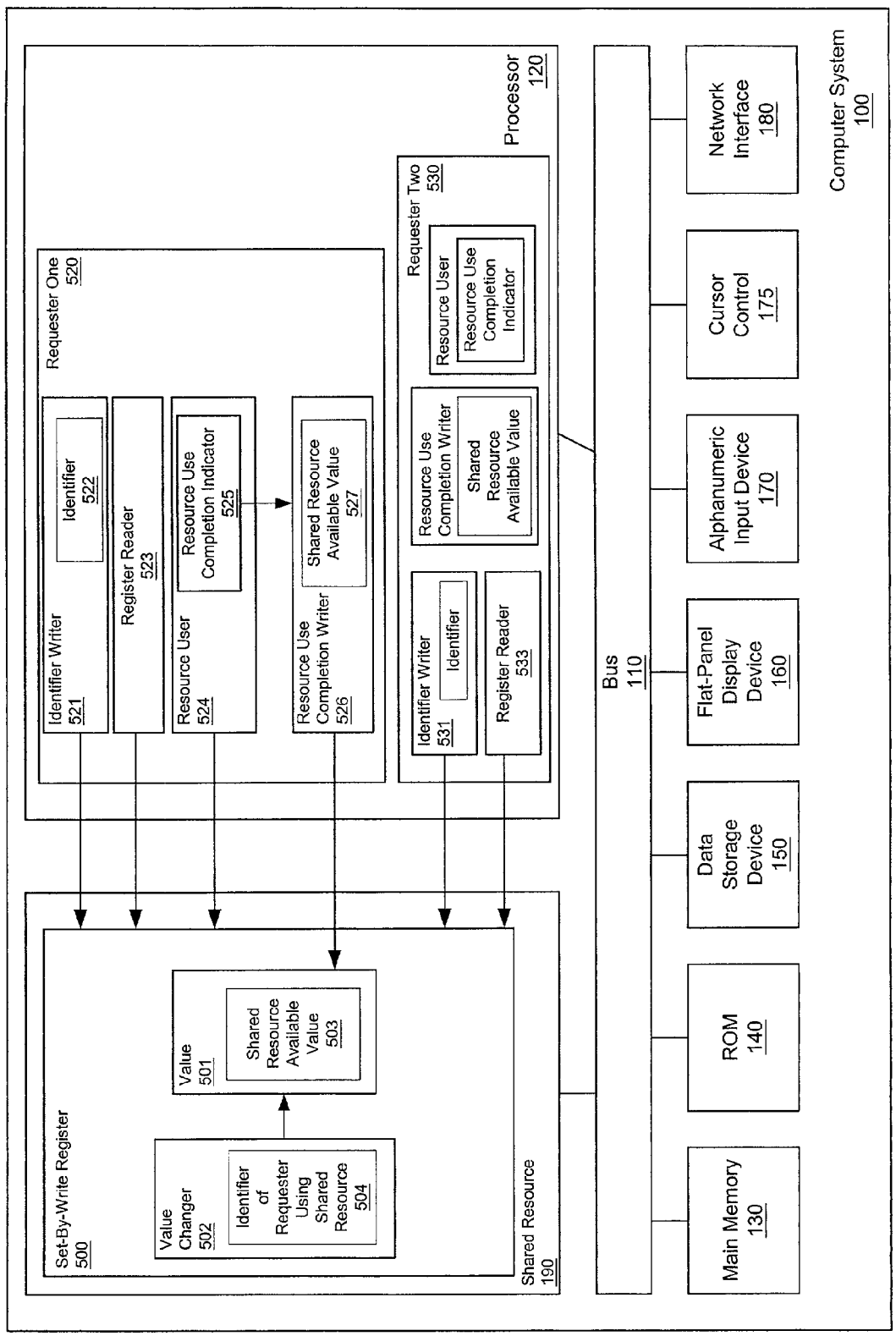
FIG. 5 is a block diagram of a computer system that contains one embodiment of a set-by-write register as a semaphore.

FIG. 5 is computer system 100 modified to include one embodiment of a set-by-write register as a semaphore. Shared resource 190 (e.g., a peripheral device) of computer system 100 contains a set-by-write register 500, which controls access to shared resource 190. Value 501 of set-by-write register 500 is set to shared resource available value 503. Requester one 520 in processor 120 contains identifier writer 521, which writes identifier 522 of requester one 520 to set-by-write register 500. Set-by-write register 500 determines based on shared resource available value 503 that shared resource 190 is available. Consequently, the write of identifier 522 to set-by-write register 500 causes value changer 502 of set-by-write register 500 to set value 501 to identifier of requester using shared resource 504. Value changer 502 then writes identifier 522 to identifier of requester using shared resource 504, to indicate to other requesters and to set-by-write register 500 that shared resource 190 is not available.

Register reader 523 of requester one 520 then reads set-by-write register 500 to determine whether set-by-write register 500 contains identifier 522. Once requester one 520 determines that value 501 contains identifier 522, resource user 524 of requester one 520 accesses shared resource 190. If requester two 530 attempts to access shared resource 190 by identifier writer 531 executing a write, followed by register reader 533 executing a read, set-by-write register 500 determines that value 501 contains identifier 522. Thus, set-by-write register indicates identifier 522 to indicate to requester two 530 that requester one 520 is using shared resource 190, which is therefore unavailable.

When requester one 520 has finished using shared resource 190, resource use completion indicator 525 of resource user 524 notifies resource use completion writer 526. Resource use completion writer 526 then writes to value 501 shared resource available value 527 indicating that shared resource 190 is available, which replaces identifier of requester using shared resource 504 containing identifier 522.

FIGS. 4 and 5 show processor 120 and shared resource 190 communicating directly. However, one should understand that processor 120 and shared resource 190 communicate via bus 110. FIGS. 4 and 5 show direct communication between processor 120 and shared resource 190 merely for convenience.

FIGS. 2 through 5 describe the invention in terms of a binary semaphore for purposes of illustration and ease of explanation. However, use of a set-by-read register or a set-by-write register as a semaphore is not limited to a binary semaphore. Furthermore, FIGS. 2 through 5 describe the invention in terms of a process attempting to access a shared resource. However, one should understand that the invention is not limited to use of a set-by-read or set-by-write register by a process (i.e., a requester can be other than a process), and that the requester can access a component other than a shared resource.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method, comprising:

receiving from a first requester a request to write an identifier of the first requester to a set-by-write register that indicates if a component is available, the request comprising the identifier of the first requester;

determining, in response to receiving the write request from the first requester, whether the component is available by an absence of an identifier of a requester other than the first requester in the set-by-write register; and replacing, if the component is available, contents of the set-by-write register indicating that the component is available, with the identifier of the first requester to reduce access to the component and to permit access to the component by the first requester.

2. The method of claim 1, wherein determining, in response to receiving the write request from the first requester, whether the component is available comprises determining based on an external indicator that the component is available.

3. The method of claim 2, wherein the external indicator comprises a flag.

4. The method of claim 1, further comprising receiving from the first requester upon completion of access to the component by the first requester, a value indicating that the component is available to replace the contents of the set-by-write register.

5. A method, comprising:
receiving from a first requester a request to write an identifier of the first requester to a set-by-write register that indicates if a component is available, the request comprising the identifier of the first requester;
determining, in response to receiving the write request from the first requester, whether the component is available by an absence of an identifier of a requester other than the first requester in the set-by-write register;
prohibiting accesses to the component by one or more additional requesters;
replacing, because the component is available, contents of the set-by-write register indicating that the component is available, with the identifier of the first requester to reduce access to the component; and
allowing the first requester to indicate that the component is available.

6. The method of claim 5, wherein determining, in response to receiving the write request from the first requester, whether the component is available comprises determining based on an external indicator that the component is available.

7. The method of claim 6, wherein the external indicator comprises a flag.

8. The method of claim 5, further comprising:
receiving from the first requester a request to write a value indicating that the component is available; determining, because of receiving the value indicating that the component is available, that access to the component has been increased; and
replacing the contents of the set-by-write register with the value indicating that the component is available.

9. A method of obtaining access to a shared resource, comprising:
receiving a request to write a second value that comprises an identifier of a first requester to a register, the request comprising the identifier of the first requester;
changing a first value to the second value in response to the request to write to the register if the register detects that the first value indicates that the shared resource is available by an absence of an identifier of a requester other than the first requester in the register and limiting access to the shared resource.

10. The method of claim 9, further comprising reading the register to determine that the register contains the identifier.

11. The method of claim 9, wherein the shared resource comprises a peripheral device in a computer system and the peripheral device contains the register.

12. The method of claim 9, further comprising:
receiving from the register the first value indicating that the shared resource is available; accessing the shared resource; and
changing upon completion of access to the shared resource, the second value to a third value increasing access to the shared resource.

13. The method of claim 12, wherein changing the second value to the third value comprises writing the third value to the register.

14. The method of claim 13, wherein the first value, the second value and the third value comprise variables.

15. The method of claim 14, wherein the first value and the third value comprise a same variable.

16. A method, comprising:
executing by a process a request from a first requester to write an identifier of the first requester, the request comprising the identifier of the first requester;
determining by a register, in response to the request, whether a first indicator allowing access to a shared resource by an absence of an identifier of a requester other than the first requester is present in the register;
changing by the register if the first indicator is present, the first indicator to a second indicator comprising the identifier of the first requester and reducing access the shared resource;
sending by the register the first indicator to the process;
determining by the process receipt of the first indicator;
using by the process the shared resource; and
replacing by the process the second indicator with a third indicator increasing access to the shared resource.

17. The method of claim 16, wherein replacing the second indicator with the third indicator comprises writing the third indicator to the register.

18. The method of claim 17, wherein the first indicator and the third indicator comprise the same indicator.

19. An article of manufacture comprising a machine-accessible medium including thereon sequences of instructions that, when executed, cause a machine to:
receive from a first requester a request to write an identifier of the first requester to a set-by-write register that indicates if a component is available, the request comprising the identifier of the first requester;
determine, in response to the write request received from the first requester, whether a component is available by an absence of an identifier of a requester other than the first requester in the set-by-write register; and
replace, if the component is available, contents of the set-by-write register indicating that the component is available, with the identifier of the first requester to reduce access to the component and to permit access to the component by the first requester.

20. The article of claim 19, wherein the sequences of instructions that cause the machine to determine, in response to the write request received from the first requester, whether the component is available comprise sequences of instructions that, when executed, cause the machine to determine, in response to the request to write the second indicator by the first requester, that the component is available based on an external indicator.

21. The article of claim 20, wherein the sequences of instructions that cause the machine to determine, in response to the write request received from the first requester, based on an external indicator that the component is available comprise sequences of instructions that, when executed, cause the machine to determine, in response to receiving the write request from the first requester, that the component is available based on a flag.

22. The article of claim 19, further comprising sequences of instructions that, when executed, cause the machine to receiving from the first requester upon completion of access to the component by the first requester, a value indicating that the component is available to replace the contents of the set-by-write register.

23. An article of manufacture comprising a machine-accessible medium including thereon sequences of instructions that, when executed, cause a machine to:
    receive from a first requester a request to write an identifier of the first requester to a set-by-write register that indicates if a component is available, the request comprising the identifier of the first requester;
    determine, in response to receiving the write request from the first requester, whether the component is available by an absence of an identifier of a requester other than the first requester in the set-by-write register;
    prohibit accesses by one or more additional requesters;
    replace, because the component is available, contents of the set-by-write register indicating that the component is available, with the identifier of the first requester to reduce access to the component; and
    allow the first requester to indicate that the component is available.

24. The article of claim 23, wherein the sequences of instructions that cause the machine to determine, in response to receiving the write request from the first requester, whether the component is available comprise sequences of instructions that, when executed, cause the machine to determine, in response to receiving the write request from the first requester, that the component is available based on an external indicator.

25. The article of claim 24, wherein the sequences of instructions that cause the machine to determine, in response to receiving the write request from the first requester, based on an external indicator that the component is available comprise sequences of instructions that, when executed, cause the machine to determine, in response to receiving the write request from the first requester, that the component is available based on a flag.

26. The article of claim 23, further comprising sequences of instructions that, when executed, cause a machine to:
    receive from the first requester a value indicating that the component is available;
    determine, because of receiving the value indicating that the component is available, that access to the component has been increased; and
    replace the contents of the set-by-write register with the value indicating that the component is available.

27. An apparatus comprising:
    a resource;
    a storage area in the resource linked to other storage areas containing a first value;
    the first value in the storage area, which the storage area changes to a second value that comprises an identifier of a requester in response to a request from the requester to write the identifier of the requester that is included in the request to the storage area; and
    the second value in the storage area.

28. The apparatus of claim 27, wherein the resource comprises a peripheral device in a computer system.

29. The apparatus of claim 27, wherein the storage area comprises a register.

30. The apparatus of claim 27, wherein the first value indicates that the resource is available.

31. The apparatus of claim 27, wherein the second value reduces access to the resource.

32. The apparatus of claim 27, wherein the other storage areas change the first value to the second value when the storage area changes the first value to the second value.

* * * * *